3,773,919
POLYLACTIDE-DRUG MIXTURES
George Albert Boswell and Richard M. Scribner, Wilmington, Del., assignors to E. I. du Pont de Nemours and Company, Wilmington, Del.
No Drawing. Continuation-in-part of abandoned application Ser. No. 868,899, Oct. 23, 1969. This application Oct. 8, 1970, Ser. No. 79,309
Int. Cl. A61k 27/12
U.S. Cl. 424—19                     16 Claims

ABSTRACT OF THE DISCLOSURE

Described and claimed are formulations of polylactide and drug to be introduced into the body which provide a slow sustained release of the drug over a controlled period of time. The polylactide is biodegradable in the body into normal or essentially normal metabolic products that have no deleterious or untoward effect on the body.

CROSS-REFERENCE TO RELATED APPLICATION

This application is a continuation-in-part of our earlier application Ser. No. 868,899, filed Oct. 23, 1969, now abandoned.

BACKGROUND OF THE INVENTION

Field of the invention

This invention relates to novel polymer-drug formulations and to their use in bringing about desired biological effects in living organisms, particularly in human beings and warm-blooded animals such as domestic animals and pets.

Description of prior art

There are a number of publications that disclose combinations of polymers and drugs designed to give sustained or delayed release of the drugs in the alimentary tract. For example U.S. Pat. 3,247,066 discloses controlled drug release compositions in which a core comprises a mixture of a drug and a water-swellable colloid which core is coated with a water permeable polymer. When taken by mouth, water in the body fluids permeates the outer coating and causes the contained colloid to swell. The swelling eventually distends and breaks the outer coating thus releasing the drug in its entirety.

U.S. Pat. 3,458,622 discloses oral drug tablets in which the drug is released at a controlled rate up to about 8 hours after ingestion. The material which controls the release rate is a blend of a polymeric vinyl pyrrolidone with a carboxy vinyl hydrophylic polymer.

R. K. Kulkarni et al., Tech. Rept. 6608, U.S. Army Medical Biomechanical Research Laboratory, Walter Reed Army Medical Center, Washington, D.C., April 1966, report histological studies show poly-DL-lactide and poly-L-lactide are nontoxic, non-tissue reactive materials which are biodegradable. However, no concept is present of combining such material with a drug to produce a controlled release drug composition when introduced under the skin of a warm-blooded animal.

Description of the invention

The formulations of this invention are absorbable, nonirritating pharmaceutical compositions consisting of one or more drugs intimately mixed with or coated by a synthetic polylactide designed to release effective amounts of a drug over a predetermined period of time. The invention is of particular value for drugs that require prolonged administration or slow sustained release, for example certain fertility-control drugs or hormones used for hormone-replacement therapy. The polylactide may be considered as a carrier or matrix for the drug and in this document the term "polylactide" includes both its generic meaning as a polyester derived from an α-hydroxycarboxylic acid and its specific meaning for the polymer derived from lactic acid (α-hydroxypropionic acid). The particular meaning in any given case will be apparent to one skilled in the art.

The novel formulations permit prolonged release of drugs for a controlled period of time from the sites of parenteral administration and minimize the frequency and thus the discomfort and inconvenience associated with conventional injection formulations. Unlike conventional depot injections, the formulations of this invention undergo biodegradation in the body into normal or essentially normal metabolic products, are nonreactive toward body tissue, and can be designed, by controlling molecular weight and composition, to undergo hydrolysis and to release drug from the depot at a desired rate.

The drug

The term "drug" is intended in its broadest sense as defined in the Federal Food Drug and Cosmetic Act Section 201(2)g:

(1) articles recognized in the official United States Pharmacopoeia, official Homeopathic Pharmacopoeia of the United States, or official National Formulary, or any supplement of any of them; and
(2) articles intended for use in the diagnosis, cure, mitigation, treatment, or prevention of disease in man or other animals; and
(3) articles (other than food) intended to affect the structure or any function of the body of man or other animals; and
(4) articles intended for use as a component of any article specified in clauses 1, 2 or 3; but does not include devices or their components, parts, or accessories.

Classes of drug which may be specifically mentioned include agents affecting the central nervous system, e.g. narcotics, such as, for example, morphine; narcotic antagonists, such as naloxone; antipsychotic agents, such as chlorpromazine and molindone; anti-anxiety agents, such as sodium pentobarbital, chlorpromazine, and molindone; antidepressives, such as imipramine hydrochloride; stimulants, such as methyl phenadate and nikethamide; hallucinogens; analgesics, such as numorphan, meperidine, and morphine; and anorexigenic agents.

Other classes are pharmacodynamic agents, e.g., antihypertensive agents as reserpine, and chlorisondamine chloride, and antianginal agents, such as papaverine, and drugs for the therapy of pulmonary disorders, such as theophylline ethylenediamine salt and epinephrine. Additional classes are chemotherapeutic agents, e.g., antiviral; antiparasitic, such as emetine hydrochloride and stibophen; antifungal agents, such as cycloheximide; and antineoplastic agents, such as triethylene thiophosphoramide; agents affecting metabolic diseases and endocrine functions, e.g., prostaglandins; athersclerosins, such as heparin; steroids and biologically related compounds; polypeptides, such as bacitracin, polymyxin B sulfate, and sodium colistimethate; natural and synthetic hormones, such as estradiol dipropionate, progesterone, and hydroxy progesterone caproate; steroid and nonsteroidal antiinflammatory agents, such as gold sodium thiomalate and hydrocortisone sodium succinate; and agents affecting thrombosis, such as crystalline trypsin; vitamins, such as vitamin $B_{12}$; anti-epilepsy agents, such as phenobarbital; and the like. It should be understood that the specific drugs mentioned by name are illustrative and not limitative.

Endocrine agents comprise a particularly useful class of compounds in this invention and can be defined either as natural hormones or as synthetic drugs that to some extent act like, or antagonize, natural hormones. Endocrine agents include, but are not limited to, both steroids and nonsteroids that function as fertility-control agents; progestogens, estrogens, androgens, antiandrogens, corticoids, anabolic agents, and antiinflammatory agents.

Endocrine agents that can be used in the formulations of the invention are illustrated by, but not limited to, compounds of the following formulas.

(A) 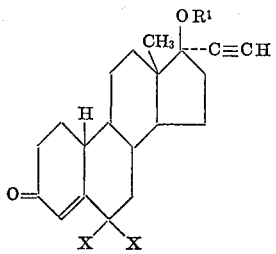

where

R is $CH_3$;
$R^1$ is H, $OCOCH_3$, or $OCOC_2H_5$; and
X is H or F

Examples are 17α-ethynyl-17β-hydroxyestr-4-en-3-one and 17α-ethynyl-6,6-difluoro-17β-propionyloxyestr-4-en-3-one. Compounds of this kind are described in U.S. Pat. 3,219,673. The second of the two compounds mentioned above may be made, for example, by essentially the process of Example 6 of U.S. Pat. 3,219,673 by substituting 6,6-difluoro-19-nortestosterone for 6,6-difluorotestosterone as the starting material, followed by propionylation of the 17β-hydroxyl group by heating with propionic anahydride in pyridine.

(B) 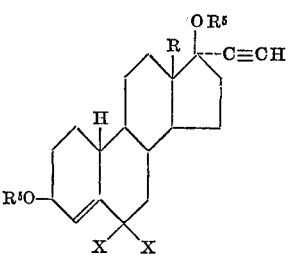

where

R is $CH_3$ or $C_2H_5$;
$R_5$ is H or alkanoyl of up to six carbons; and
X is H or F Examples are 17α-ethynyl-6,6-difluoro-3β, 17β-diacetoxyestr-4-ene, 17α - ethynyl-3β,17β-dibutanoyloxyestr-4-ene and 13β - ethyl-17α-ethynyl-6,6-difluoro-3β,17β-dihydroxygon-4-ene. Those compounds of this group in which both X's are fluorine are the subject of commonly assigned U.S. patent application Ser. No. 720,493 filed Apr. 11, 1968, in the name of George Boswell.

The steps involved in the preparation of the first of the three compounds mentioned in the preceding paragraph may be summarized as follows:

5 - estrene-3β,17β-diol diacetate [Iriarte, J. Am. Chem. Soc. 81, 436 (1959)] is converted to 5α-fluoro-3β,17β-dihydroxyestran-6-one diacetate with NOF in methylene chloride. The latter is reacted with $SF_4$ in methylene chloride in the presence of a small amount of water to give 5α,6,6-trifluoroestrane-3β,17β-diol diacetate, which is hydrolyzed to 5α,6,6-trifluoroestrane-3β,17β-diol with concentrated HCl in methanol. The diol is oxidized to 5α,6,6-trifluoroestrane-3,17-dione with excess 8 N chromic acid in acetone. Hydrogen fluoride is eliminated from this dione with neutral alumina to give 6,6-difluoro-4-estrene-3,17-dione, which is reduced to 6,6-difluoro-4-estrene-3ξ,17β-diol with sodium borohydride in absolute ethyl alcohol. The resulting hydroxyl group in the 3β-position is reoxidized to a keto group with dichlorodicyanobenzoquinone to give 6,6-difluoro-17β-hydroxyestr-4-ene-3-one. The 3-keto group of the latter is protected by forming its ethylene ketal with ethylene glycol in benzene in the presence of p-toluenesulfonic acid monohydrate. The 17β-hydroxyl group is then oxidized to a keto group with chromium trioxide in pyridine to give 6,6- difluoroestr-4-ene-3,17-dione 3-ethylene ketal. The latter is reacted with ethynylmagnesium bromide to give 6,6-difluoro-17α-ethynyl-17β-hydroxystr-4-en-3-one, which is reduced to 6,6-difluoro-17α-ethynylestr-ene-3β,17β-diol with lithium tri - t - butoxy - aluminum hydride in tetrahydrofuran. Acetylation of this diol by heating with acetic anhydride in pyridine gives 6,6- difluoro-17α-ethynylestr-4-ene-3β, 17β-diol diacetate.

(C) 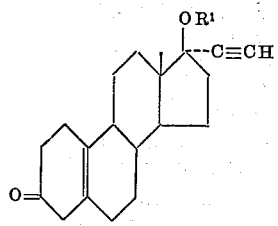

where $R^1$ is H or $CO(CH_2)_nCH_3$, n being 0–6. Examples are 17α - ethynyl - 17β-hydroxyesrt-5(10)-ene-3-one and 17α-ethynyl-17β-pentanoyloxyestr-5(10)-ene-3-one.

(D) 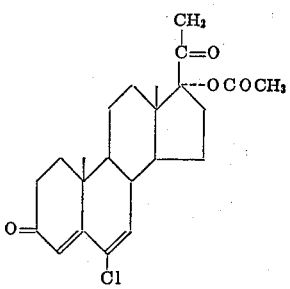

17α-acetoxy-6-chloropregna-4,6-diene-3,20-dione (E) 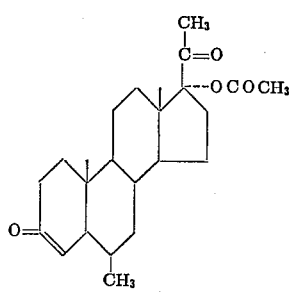

17α-acetoxy-6A-methylpregn-4-ene-3,20-dione (F) 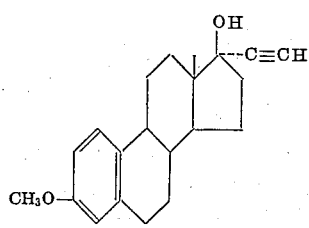

17α-ethynylestra-1,3,5(10)-triene-3-ol 3-methyl ether (G) 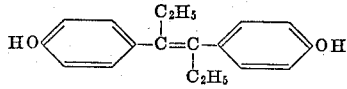

diethylstilbesterol (H)

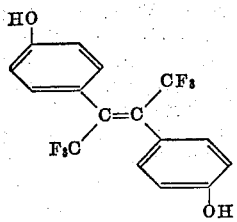

bis(trifluoromethyl)stilbesterol. This compound is the subject of commonly assigned U.S. patent application Ser. No. 766,631, filed Oct. 10, 1968, in the name of W. Middleton.

(I).

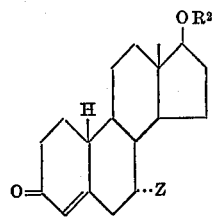

where R² is H, CH₃(CH₂)ₙCO (n being 0 to 6),

AdCH₂OCO (Ad being 1-adamantyl),

m being 0 or 1; and Z is H or CH₃.

Formula I represents 19-nortestosterone, 7α-methyl-19-nortestosterone, and esters thereof. Examples are 17β-hydroxyestr-4-en-3-one 4'-methylbicyclo[2.2.2]oct-2'-en-1'-carboxylate, 17β-hydroxyestr-4-en-3-one 4'-methylbicyclo[2.2.2]octane-1'-carboxylate, 7α-methyl-17β-hydroxyestr-4-en-3-one heptanoate, and 7α-methyl-17β-hydroxyestr-4-en-3-one 1'-adamantanemethanol carbonate. Some of these compounds are disclosed in U.S. Pat. 3,433,813; others are disclosed in commonly assigned patent application Ser. No. 690,093 filed Dec. 13, 1967 in the name of George Boswell; and in commonly assigned patent application Ser. No. 773,629, filed Nov. 5, 1968 in the name of Richard Scribner. The first compound mentioned in this paragraph may be made by a series of steps disclosed in Ex. 4 of Ser. No. 773,629.

They can be summarized as follows:

4-methyl bicyclo[2.2.2]oct-2-ene-1-carbonyl chloride is prepared by reacting the free acid with thionyl chloride in benzene in the presence of a trace of dimethylformamide. Reaction of the acid chloride with 17β-hydroxyestra-4-en-3-one (19-nortestosterone) in benzene with a small amount of pyridine as an acid acceptor gives the desired ester.

(J)

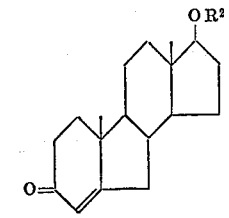

where R² is the same as in Formula I.

Formula J represents B-nortestosterone and esters thereof. Examples are 17β-hydroxy-B-norandrost-4-en-3-one acetate and 17β-hydroxy-B-norandrost-4-en-3-one 4'-methylbicyclo[2.2.2]oct-2'-ene-1'-carboxylate.

(K)

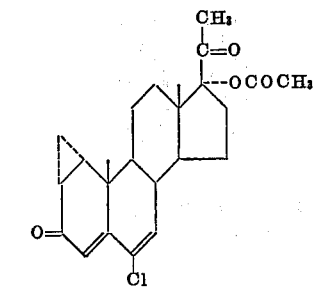

17α-acetoxy-6-chloro-1α,2α-methylenepregna-4,6-diene-3,20-dione (L)

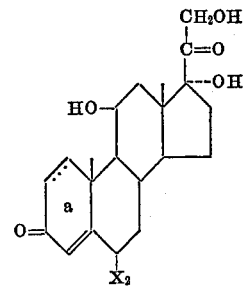

where the bond designated "a" is a single or double bond and X is H. Formula L represents hydrocortisone and prednisolone.

(M)

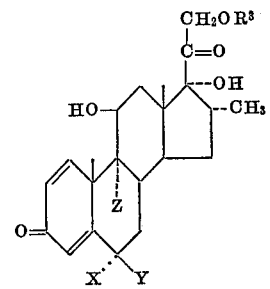

where R³ is H, COCH₃, COCH₂CH₃, or COC(CH₃)₃; and X, Y, and Z are H. An example is 11β,17α-dihydroxy-21-trimethylacetoxy-16α-methylpregna-1,4-diene-3,20-dione.

(N)

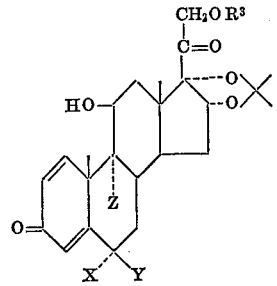

where R³, X, Y, and Z are the same as in Formula M. Examples are the 16,17-acetonides of the compounds exemplifying Formula M.

(O)

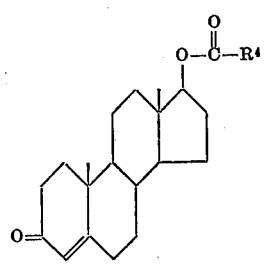

where $R^4$ is $CH_3(CH_2)_n$,

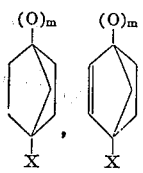

or $AdCH_2O$; X is H, $CH_3$, or $C_2H_5$, $n$ is 0–6, and $m$ is 0 or 1. Formula O represents esters of testosterone.

The polylactide

The polylactide carrier or matrix is polylactide, polyglycolide (the polylactide derived from hydroxyacetic acid), or a copolymer of lactide or glycolide containing up to 50% by weight of comonomer repeating units of the formula

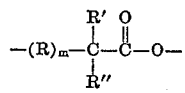

wherein R is lower alkylene, preferably methylene (—$CH_2$—) or ethylene (—$CH_2CH_2$—), $m$ is 0 or 1, R' is hydrogen or lower alkyl, R'' is hydrogen or alkyl of up to about 22 carbons when $m$ is 0 and hydrogen or lower alkyl when $m$ is 1, and can be the same as R' or different. Preferred, because of availability of starting materials, are comonomer reepating units derived from α-hydroxycarboxylic acids, i.e., units of the above formula in which $m$ is zero.

It will be seen that when $m$ is zero, R' is $CH_3$, and R'' is H in the above formula, the formula describes a repeating unit derived from lactic acid. When $m$ is zero and both R' and R'' are H, the formula describes a repeating unit derived from glycolic acid. The definition of the polymer, therefore, includes lactide/glycolide copolymers containing any proportions of the two types of repeating units.

When R' and R'' are different, the hydroxy acid from which the repeating unit is derived, and therefore the unit itself, can exist in optically active (D- and L-) forms or in an optically inactive (DL-, racemic) form. For example, repeating units derived from lactic acid, considered either as the principal polymer component or as the comonomer component, can be present as D-lactide units, L-lactide units, or DL-lactide units. For example, a polymer containing both L-lactide and DL-lactide repeating units is defined in the present invention as a copolymer, e.g., an L-lactide/DL-lactide copolymer.

Illustrative of the comonomers which can be employed with lactide or glycolide to form copolymers useful in preparing the formulations of this invention are β-propiolactone, tetramethylglycolide, β-butyrolactone, γ-butyrolactone, pivalolactone, and intermolecular cyclic esters of α-hydroxybutyric acid, α-hydroxyisobutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, α-hydroxystearic acid, and α-hydroxylignoceric acid.

In addition to being usable as a comonomer, β-butyrolactone can be used as the sole monomer or as the principal monomer along with any of the comonomers recited above, i.e., poly-β-butyrolactone and copolymers thereof can be used as polymers in the formulations of the invention. The term polylactide as used in this specification and claims is therefore also intended to include poly-β-butyrolactone and copolymers of β-butyrolactone with the comonomers recited in the immediately preceding paragraph.

Where glycolic or lactic acids are used to prepare the polymer, it is clear that the polymer's hydrolysis products will include glycolic or lactic acids which are normal metabolites of the body. Where the polymer is prepared from the other compounds listed above, the hydrolysis products will be related in structure to those derived from glycolic or lactic acid polymers and will have no deleterious or untoward effect on the body.

In preparing the polymers and copolymers from which the formulations of this invention are made, the appropriate intermolecular cyclic esters (generically, lactides) or intramolecular cyclic esters (lactones) of the hydroxy acids are used. Intermolecular cyclic esters containing six-membered rings, e.g., glycolide, are usually used to introduce repeating units derived from alpha-hydroxy acids. Monomeric lactones, e.g., beta-propiolactone and gamma-butyrolactone, are usually used to introduce repeating units derived from beta- or gamma-hydroxy acids.

The polymerization is effected by heating the lactide above its melting point in the presence of a polyvalent metal oxide or compound thereof, under anhydrous conditions in an inert atmosphere.

Specially useful catalysts are zinc oxide, zinc carbonate, basic zinc carbonate, diethylzinc, tributylaluminum, titanium, magnesium or barium compounds, litharge, and the like.

The amount and type of catalyst used determine the particular temperature and time required to produce polymer useful for conversion to the formulations of this invention. Thus, the amount of catalyst can be as low as 0.01 weight percent or as high as 2 weight percent of the total weight of reactants. As a rule, the lower the amount of catalyst, the longer the time required to produce polymer of a given inherent viscosity and, conversely, the higher the catalyst concentration, the shorter the time. The best balance is usually obtained employing from 0.02 weight percent to 1 weight percent of catalyst.

In general, it is desirable to agitate the reaction mixture continuously during the polymerization in order to produce a homogeneous polymer at good conversions and to conduct the reaction in two steps, the first being carried out at a lower temperature than the second, or finishing step. Other methods, such as those disclosed in U.S. Pats. 2,703,316 and 2,758,987, can be used in making the polymers. The degree of polymerization can be varied over a considerable range. In general, the higher the degree of polymerization, that is, the higher the molecular weight of the polylactide, the slower is its rate of absorption, etc. in the body and the slower will be the rate of release of its associated drug. Polymers that are polymerized to the extent of being solids are generally preferred.

The following is an example of a method for preparing a polymer or copolymer useful in the formulations of this invention: Lactide, which is the intermolecular ester derived from two moles of lactic acid, is purified by several crystallizations from carbon tetrachloride and placed either alone in the case of homopolymerization, or with one or more comonomers in case of copolymerization, in a throughly dried reactor equipped with a stirrer and nitrogen inlet tube. Dry nitrogen is introduced immediately above the reaction mixture and heating and stirring are started. When the temperature of the reaction mixture has reached about 100° C., the nitrogen inlet is replaced by a thermometer, and from about 0.01 to 2 weight percent of an oxide or salt of a Group II metal of atomic number 12 through 56, or litharge is added. In the case of copolymerization with a liquid comonomer the liquid comonomer is preferably added after the lactide has melted. Heating is continued until polymer having the desired inherent viscosity, e.g., 0.5 at 0.1% concentration in benzene at 25° C. is obtained. This may require from a few minutes up to 25 or more hours, depending upon the catalyst used. The foregoing is not intended to be limiting since the viscosity may range from about 0.3 or less to about 4.0 or more (in benzene).

Polymer, produced as above, may be suitably further treated by cutting it into small pieces, dissolving in a suitable solvent, for example, benzene, toluene, or xylene, and precipitating the polymer by pouring the solution into a large volume of a nonsolvent for the polymer, desirably hexane or methanol. The precipitated polymer is removed by filtration, transferred to a blender and a nonsolvent for the polymer is added. The blender is started and after a homogeneous dispersion has been obtained, the dispersion is filtered. The polymer is allowed to dry on the filter, and is then transferred to a vacuum oven. After drying overnight at 100° C., the polymer is removed from the oven and allowed to cool to ambient temperature.

Preparation and administration of the formulation

The drug and the polymer can be mixed, and the intimacy of mixing, particle size, and particle shape of the formulation can be varied, by any of a number of known methods. Intimacy of mixing, particle size, and particle shape of the formulations of the invention will depend to some extent on the intended use. High homogeneity can be obtained by mixing the components in the molten state, cooling, and grinding the resulting solid. A formulation so obtained is suitable for injection as $0.1\mu$ to $1000\mu$ particles suspended in saline solution or a pharmaceutically acceptable oil. In some cases particles with cores of pure drug coated with various thicknesses of polymer can be preferred for delayed and/or sustained release. Relatively large pellets (1–10 mm.) may be preferred for reversible implantation in animals by surgery or by injection as projectiles. For this use adequate homogeneity can usually be realized by grinding or milling the drug and the polymer together before forming pellets under pressure. Known techniques of encapsulation, including micro-encapsulation, can be used to mix the polymer and the drug. The formulations of this invention provide a slow steady release of drug in contradistinction to conventional preparations which generally produce a rapid surge followed by a fairly quick decline in drug effect.

Polylactide-drug mixtures of the invention may contain pharmaceutically acceptable inert additives such as plasticizers. Typical plasticizers are Carbowax® polyethylene glycols, glycerides, and ethylcellulose.

The relative proportions of the drug and polylactide polymer can be varied over a wide range depending on the desired effect. The drug can be present in an amount which will be released over controlled periods of time. This necessarily implies a quantity of drug greater than the conventional single dose. This requires that the polylactide must not break down or become absorbed by the body so rapidly as to release undue quantities of drug. Proportions may range from 1 percent of drug and 99 percent of the polylactide to 99 percent of drug and 1 percent of polylactide. Ratios which have shown good results include 1 part of drug to from 4 to 20 parts of polylactide.

These formulations can be injected as fluid suspensions by syringe into subcutaneous cellular tissue or muscular tissue, or implanted in pellet form subcutaneously or intramuscularly. Liquid vehicles useful for suspensions of the drug-polymer formulation include water or aqueous solutions such as normal sodium chloride solution or sodium carboxymethyl cellulose in water. Oils such as sesame oil or peanut oil containing, if desired, dissolved adjuvants such as benzyl alcohol, may also be used to prepare suspensions of the polymer-drug formulation.

Drug compounds of the classes mentioned earlier may be coated, embedded, or intimately mixed in or with a matrix of one or a combination of different chain-length biodegradable polylactide polymers defined previously, to give a drug-polymer mixture which will provide a controlled sustained release of the drug compound over a period of 8 hours to 2 months or longer when administered parenterally.

Coating, embedding or intimately mixing the drug compound with the polymer can be accomplished in the following ways:

(A) Coating the discrete drug particles or drug-particle aggregates, agglomerates or flocs by:

(1) Spray drying

Finely divided drug particles are suspended in a solvent system in which the drug is not soluble containing the dissolved polymer and other agents e.g., extenders, plasticizers, dyes, etc., in the drug/polymer ratio from 1/99 to 99/1, followed by spray drying. For example: Drug particles 0.2 to 10 microns in size and equal to the weight of polymer used are suspended in a chloroform solution of polymer in such a concentration so as to give a liquid viscosity suitable for atomizing. The drug-polymer mixture is spray-dried using conventional methods of atomizing e.g., centrifugal wheel, pressure and two-fluid nozzle using appropriate drying conditions and temperatures that do not exceed the softening point of the polymer and do not exceed the melting point or decomposition point of the drug.

(2) Pan coating or fluid-bed coating

Place granules or pellets, 5 microns to 20 mm., preferably between 0.25 and 10 mm. diameter, in a rotating coating pan or fluid-bed drier, and apply polymer (dissolved in a carrier to a suitable viscosity for spraying) by spraying until a suitable coating quantity has been deposited to give the required release-rate characteristics. For example: Granules of drug are prepared by extrusion of a wet granulation or other suitable methods known to the art, and dried. 16-to-40-mesh granules are placed in a rotating coating pan and a solution of polymer, dissolved in a suitable nonaqueous volatile solvent, is sprayed onto the moving granules with a continuous fine spray under conditions known to the art, until a coating giving the desired release rate has been applied. The granules are then dried.

(3) Micro-encapsulation

Suspend drug particles, granules or pellets (.1 to 2000 microns diameter) in a solvent system in which the drug is not soluble, and which contains in solution the polylactide or polylactide mixture. Add an agent incompatible with the polymer-solvent system, such as an incompatible polymer, a non-solvent for the polymer, or a salt, or vary conditions such as temperature and pressure. One or a combination of the above will precipitate the polymer, coating the drug particles, granules or pellets. For example, 0.5-to-25-micron drug particles are suspended in chloroform (in which they are not soluble) containing the polylactide polymer mixture in solution at such as concentration as to give a low-viscosity solution. A miscible solvent in which the polymer is not soluble, such as hexane, is then added slowly to precipitate the polymer. The coated particles are filtered and washed with hexane and allowed to dry. The powder is stored for use in the suitable dosage form.

(B) Embedding:

The polymer or polymer mixture is melted and an non-heat-labile drug is suspended and thoroughly dispersed in the melt. The melt is congealed by spraying, or in a mass and ground into small particles to give a polymer matrix with the drug embedded. For example: the polylactide polymer mixture is melted and 0.5-to-400 micron (preferably 0.5-to-25-micron) drug particles are suspended and thoroughly dispersed in the molten polymer in a concentration necessary to give the desired release rate patterns. The polymer is congealed by cooling in a mass and ground into small pieces 1 to 200 microns in size.

(C) Intimate mixing:

The drug and polymer are dissolved in a common solvent and the solvent is removed in some suitable way (spray-drying, flash-evaporation, etc.). For example: the drug and polylactide polymer are dissolved in chloroform in a 1:1 ratio and to a concentration of 2% in the solvent.

The solvent is flash-evaporated and the resulting film is scraped from the flask and powdered.

The above sustained-release powder, granular or pellet forms may be included in the following type formulations:

(1) Suspensions

Active ingredients of low solubility which have been embedded in or coated with the polymer and are in a finely divided state, 200 microns diameter or less, preferably 50 microns or less, may be suspended in a suitable pharmaceutical vehicle for injection. This vehicle may also contain suspending and thickening agents, e.g., methylcellulose, and preservatives. These ingredients are combined to give a stable suspension which will release the active ingredient over the time period desired.

(2) Emulsions

Active ingredients insoluble in oil in fine powder form, preferably 10 microns or less, are thoroughly dispersed in a suitable oil, which is, in turn, emulsified in an external aqueous phase (oil in water) using suitable emulsifying agents, e.g. triethanolamine oleate, polyoxyethylene sorbitan monooleate, acacia, gelatin, etc. The aqueous phase may also contain agents such as protective colloids and preservatives, formulated to give a stable emulsion which will provide a controlled release of the active ingredient over the time period desired.

(3) Aqueous suspensions

The active ingredient embedded and/or coated with the polymer in a particle size no greater than 200 microns and preferably no greater than 50 microns is suspended in an aqueous solution which may contain thickening agents, e.g. carboxymethylcellulose; preservatives, e.g. phenol; suspending agents, e.g. polyvinylpyrrolidone; surface active agents; buffers and dextrose or saline to adjust for isotonicity.

(4) Non-aqueous suspensions

The active ingredient embedded and/or coated with the polymer in a particle size usually no greater than 200 microns and preferably no greater than 50 microns is suspended in a suitable oil, e.g. sesame oil, peanut oil, vegetable oil, etc. The suspension may contain preservatives e.g. chlorbutanol or methylparaben and propylparaben mixtures, and suspending agents such as aluminum monostearate.

In both the aqueous and non-aqueous preparations, processing will be such that the final product will be sterile and will meet all sterility test standards.

SPECIFIC EMBODIMENTS OF THE INVENTION

The following examples illustrate the products and processes of the invention.

Example 1

Poly-L-lactide [$\eta_{inh}$ 1.64, 0.1% in benzene; M.P. 171° by DTA (differential thermal analysis)], 4.0 g., was melted in a stainless steel beaker and to the melt at 235–245° was added 1.0 g. of 17β-estradiol. The mixture was stirred until it was clear and homogeneous and then poured into a stainless steel plate where it cooled to a colorless, brittle glass.

Example 2

Poly-DL-lactide [$\eta_{inh}$ 1.26, 0.1% in benzene; M.P. 150° by DTA] 2.0 g. was similarly mixed with 0.50 g. of 17β-estradiol.

Example 3

L-lactide/glycolide [1/1 by wt.] copolymer [$\eta_{inh}$ 1.44, 0.1% in chloroform; M.P. indefinite], 2.0 g., was similarly mixed with 0.5 g. of 17β-estradiol.

Example 4

Poly-L-lactide [$\eta_{inh}$ 1.26, 0.1% in benzene], 1.90 g. and 17β-estradiol (0.10 g.) were mixed together as a powder and then melted at 230°. The melt was cooled in Dry Ice, broken into small pieces, and pressed into 50 mg. pellets for implantation in animals.

Example 5

Poly-L-lactide [$\eta_{inh}$ 3.97, 0.1% in benzene], 1.90 g. was melted at 250°, and 2α,17α-diethynyl-A-nor-5α-androstane-2β,17β-diol (0.10 g.) was added to the melt under nitrogen. The melt was cooled, chopped into small pieces, and pressed into pellets at 150°.

Pellets of the product weighing about 80 mg. were implanted in female Holtzman rats and produced an estrogenic response lasting for about one month.

Example 6

L-lactide/glycolide [1/1 by wt.] copolymer [$\eta_{inh}$ 1.44, 0.1% in benzene], 4.0 g., was melted at 225° and 17β-estra-diol, 0.21 g., was mixed into the melt. The homogeneous mixture was poured onto a stainless steel plate, ground into a powder, and pressed into pellets.

Pellets of the product weighing about 100 mg. gave a strong estrogenic response over a period of four weeks when implanted in female rats.

Example 7

Poly-L-lactide, 1.0 g., and 6,6-difluoro-17α-ethynyl-17β-hydroxyestr-4-en-3-one, 0.10 g., were mixed, and warmed to the melting point. The mixture was cooled and the brittle glass was ground into a powder.

Example 8

In a manner analogous to Example 7, 1.0 g. of poly-L-lactide and 0.10 g. of 17β-hydroxyestr-4-en-3-one adamantane-1′-methanolcarbonate were mixed and ground to a powder.

Example 9

Poly-DL-lactide, 900 mg., and 6,6-difluoro-17α-ethynyl-17β-hydroxyestr-4-en-3-one, 100 mg., were melted together to give a clear, colorless syrup which cooled to a glass that was ground into small particles.

What is claimed is:

1. A pharmaceutical depot composition in particle or pellet form for parenteral administration designed to slowly release effective amounts of a drug over a controlled period of time comprising:
    a drug
        in an effective depot amount greater than a conventional single dose,
        in homogeneous mixture with
    a solid polylactide polymer which polymer is nonreactive toward body tissues and undergoes biodegradation in the body into normal or essentially normal metabolic products, and having an inherent viscosity of 0.5 to 4.0 when measured at 0.1% concentration in benzene at 25° C.,
    the proportions of the drug and polylactide polymer ranging from 1 to 99% of one to a corresponding 99 to 1% of the other, the rate of absorption of the polylactide polymer and the rate of release of its associated drug being gradual.

2. The pharmaceutical composition of claim 1 in which the drug is an endocrine agent.

3. The pharmaceutical composition of claim 2 in which the endocrine agent is a fertility control agent.

4. The pharmaceutical composition of claim 2 in which the endocrine agent is 17α-ethynyl-17β-hydroxyestr-5(10)-en-3-one.

5. The pharmaceutical composition of claim 2 in which the endocrine agent is 17α-acetoxy-6-chloropregna-4,6-diene-3,20-dione.

6. The pharmaceutical composition of claim 2 in which the endocrine agent is 17α-acetoxy-6-chloro-1α,2α-methylenepregna-4,6-diene-3,20-dione.

7. The pharmaceutical composition of claim 2 in which the endocrine agent is 17α-ethynyl-6,6-difluoro-17β-propionyloxyestr-4-en-3-one.

8. The pharmaceutical composition of claim 2 in which the endocrine agent is 17α-ethynyl-6,6-difluoro-3β,17β-diacetoxyestr-4-ene.

9. The pharmaceutical composition of claim 2 in which the endocrine agent is 17β-hydroxyestr-4-en-3-one 4'-methylbicyclo[2.2.2]oct-2'-en-1'-carboxylate.

10. The pharmaceutical composition of claim 1 in which the solid polylactide polymer is derived from an alpha hydroxcarboxylic acid.

11. The pharmaceutical composition of claim 6 in which the solid polylactide polymer is derived from lactic acid.

12. The injectable pharmaceutical particles of claim 1 dispersed in normal saline solution or a pharmaceutically acceptable oil.

13. A pharmaceutical depot composition in accordance with claim 1 in the form of injectable particles ranging in size from about 0.1 to 1000 microns.

14. A pharmaceutical composition in accordance with claim 1 in the form of pellets for implantation.

15. The process of releasing an effective amount of a parenteral depot drug over a controlled period of time comprising the parenteral administration to a human being or animal of a composition of claim 1.

16. The process of releasing an effective amount of a parenteral depot fertility control endocrine agent comprising the parenteral administration to a female human being or animal of a composition of claim 3.

References Cited
UNITED STATES PATENTS

| | | | |
|---|---|---|---|
| 3,531,561 | 9/1970 | Trehu | 264—210 |
| Re. 26,963 | 10/1970 | Hardy | 424—89 |
| 2,625,158 | 1/1953 | Lee et al. | 128—260 |
| 3,435,008 | 3/1969 | Schmitt et al. | 260—78.3 |
| 3,225,766 | 12/1965 | Baptist et al. | 128—335.5 |
| 3,499,445 | 3/1970 | Reed | 128—260 |
| 3,185,625 | 5/1965 | Brown | 424—91 X |
| 2,824,546 | 2/1958 | Klette | 119—1 |
| 2,413,419 | 12/1946 | Saunders et al. | 424—358 X |

SHEP K. ROSE, Primary Examiner

U.S. Cl. X.R.

128—260; 424—22, 78, 243

PO-1050
(5/69)

UNITED STATES PATENT OFFICE
CERTIFICATE OF CORRECTION

Patent No. 3,773,919      Dated November 20, 1974

Inventor(s) George Albert Boswell, Jr. and Richard M. Scribner

It is certified that error appears in the above-identified patent and that said Letters Patent are hereby corrected as shown below:

Col. 2 line 49, cancel "and chlorisondamine"

line 50, cancel "chloride"

line 55, cancel the entire line line 56, cancel "such as triethylene thiophosphor-"

line 57, cancel "amide"

line 60, cancel "bacitracin"

Col. 3 line 21, cancel "R is $CH_3$"

line 57, after "1968" insert --now U.S. patent 3,511,861--

Col. 5 line 13, after "1968" insert --now U.S. patent 3,683,009-- line 39, cancel "or 1"

line 48, after "1967" insert --now U.S. patent 3,523,126-- line 50, after "1968" insert --now U.S. patent 3,515,720--

Col. 6 cancel lines 63 and 64

Col. 7 line 11, cancel "or 1"

Col. 6 line 25, the "a" in the formula should be next to the dotted line, not in the center of the ring.

Signed and sealed this 1st day of October 1974.

(SEAL)
Attest:

McCOY M. GIBSON JR.
ring Officer

C. MARSHALL DANN
Commissioner of Patents